United States Patent
Jensen et al.

(10) Patent No.: US 12,172,647 B2
(45) Date of Patent: Dec. 24, 2024

(54) METHOD AND SYSTEM FOR ENGINE AND MACHINE CONTROL

(71) Applicant: Caterpillar Inc., Peoria, IL (US)

(72) Inventors: Andrew C. Jensen, Dunlap, IL (US); Sylvain J. Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 373 days.

(21) Appl. No.: 17/207,280

(22) Filed: Mar. 19, 2021

(65) Prior Publication Data

US 2022/0297693 A1    Sep. 22, 2022

(51) Int. Cl.

| | |
|---|---|
| *B60W 30/188* | (2012.01) |
| *B60W 10/06* | (2006.01) |
| *B60W 10/10* | (2012.01) |
| *B60W 10/30* | (2006.01) |
| *B60W 30/184* | (2012.01) |
| *E02F 9/20* | (2006.01) |
| *F02D 35/00* | (2006.01) |
| *E02F 3/32* | (2006.01) |

(52) U.S. Cl.
CPC ........ *B60W 30/1884* (2013.01); *B60W 10/06* (2013.01); *B60W 10/10* (2013.01); *B60W 10/30* (2013.01); *B60W 30/184* (2013.01); *E02F 9/2066* (2013.01); *F02D 35/0007* (2013.01); *B60W 2300/17* (2013.01); *B60W 2510/0638* (2013.01); *E02F 3/32* (2013.01); *F02D 2200/101* (2013.01)

(58) Field of Classification Search
CPC .. B60W 30/1884; B60W 10/06; B60W 10/10; B60W 10/30; B60W 30/184; B60W 2300/17; F02D 35/0007; F02D 2200/101; E02F 9/2066; E02F 3/32
USPC ........................................................... 701/50
See application file for complete search history.

(56) References Cited

U.S. PATENT DOCUMENTS

| | | | |
|---|---|---|---|
| 7,350,611 B2 | 4/2008 | Betz et al. | |
| 8,060,284 B2 | 11/2011 | Hendryx | |
| 8,897,976 B2 | 11/2014 | Lister et al. | |
| 9,580,061 B2 | 2/2017 | Pipho et al. | |
| 9,688,414 B2 | 6/2017 | Burns et al. | |
| 9,796,037 B2 | 10/2017 | Beeson et al. | |
| 2016/0059825 A1 | 3/2016 | Coombs | |
| 2017/0089043 A1 * | 3/2017 | Chang | G05B 19/042 |

FOREIGN PATENT DOCUMENTS

| | | | | |
|---|---|---|---|---|
| EP | 1923289 B1 | 5/2017 | | |
| WO | WO-2009073128 A2 * | 6/2009 | | B60K 6/12 |

* cited by examiner

*Primary Examiner* — Lindsay M Low
*Assistant Examiner* — Omar Morales
(74) *Attorney, Agent, or Firm* — Bookoff McAndrews, PLLC (57) ABSTRACT

A mobile machine control method includes receiving, by a single controller, a first request for movement of the machine by a ground-engaging device, receiving, by the single controller, a second request for movement of an implement system of the machine, and determining, with the single controller, an amount of desired power from an engine to satisfy the first request and the second request. The method also includes selecting an engine speed from a plurality of candidate engine speeds to produce the desired power and operating the engine at the selected engine speed to produce the desired power.

20 Claims, 4 Drawing Sheets

METHOD AND SYSTEM FOR ENGINE AND MACHINE CONTROL

TECHNICAL FIELD

The present disclosure relates generally to systems for machine control, and more particularly, to methods and systems for controlling one or more implements and a prime mover of a mobile machine.

BACKGROUND

Machines are complex devices that include multiple systems that operate in concert to perform a task. In the example of a machine having an internal combustion engine, the machine may include an air intake system, a fuel delivery system, a hydraulic system for controlling an implement, a transmission system for driving a device that provides locomotion, and other interrelated components. Typically, groups of components are controlled by separate controllers in communication with each other across a communication network, such as a Controller Area Network (CAN) bus. While systems with multiple controllers have been employed in many types of devices, there are disadvantages to multi-controller systems in machine systems. For example, when machine and engine controllers are provided separately, the machine controller may transmit a request to the engine controller for a certain engine speed, based on the needs of a tool and the systems operating the tool. However, because these requests do not take into account complex engine dynamics, this engine speed may be significantly different than an optimal speed for the engine, causing increased fuel consumption, increased emissions of undesirable compounds, poor responsiveness, and other issues. In some cases, such a speed request can cause the engine to operate at an engine speed and torque that causes the engine to generate smoke.

A combined engine and hybrid power system for a work vehicle is disclosed in U.S. Pat. No. 9,580,061 (the '061 patent) to Pipho et al. The system described in the '061 patent includes a speed controller that works together with an engine control unit to provide a powertrain speed governor torque based on a speed setpoint which is provided by either the operator or a vehicle controller. The engine control unit communicates with a hybrid powertrain controller such that the two act as a combined engine control system to provide a preferred torque to a powertrain. While the system described in the '061 patent may be useful in some circumstances, it may experience difficulties when the commands sent from the engine control unit conflict with those of the separate hybrid power train controller. Additionally, the reliance on a speed or torque governor and a speed setpoint can cause the system to select an undesirable speed or torque.

The disclosed method and system may solve one or more of the problems set forth above and/or other problems in the art. The scope of the current disclosure, however, is defined by the attached claims, and not by the ability to solve any specific problem.

SUMMARY

In one aspect, a mobile machine control method may include receiving, by a single controller, a first request for movement of the machine by a ground-engaging device, receiving, by the single controller, a second request for movement of an implement system of the machine, and determining, with the single controller, an amount of desired power from an engine to satisfy the first request and the second request. The method may also include selecting an engine speed from a plurality of candidate engine speeds to produce the desired power and operating the engine at the selected engine speed to produce the desired power.

In another aspect, a machine control method may include receiving, by a machine and engine controller: requests for movement of the machine and for movement of an implement and feedback signals indicative of a movement of the machine and a movement of the implement. The machine control method may also include determining an engine speed based on the requests for movement from a plurality of candidate engine speeds and generating an engine command associated with the engine speed, based on the received requests and feedback information.

In yet another aspect, a machine control system may include a ground-engaging traction device, an internal combustion engine, a transmission connected between the internal combustion engine and the ground-engaging traction device, and a hydraulically-actuated implement system. The machine control system may also include a machine and engine controller configured to: receive a first request for movement of the ground-engaging traction device, receive a second request for movement of the implement system, select an engine speed from a plurality of candidate engine speeds based on the first request and the second request, and generate commands to operate the internal combustion engine at the selected engine speed, to control the hydraulically-actuated implement system, and to control the transmission.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
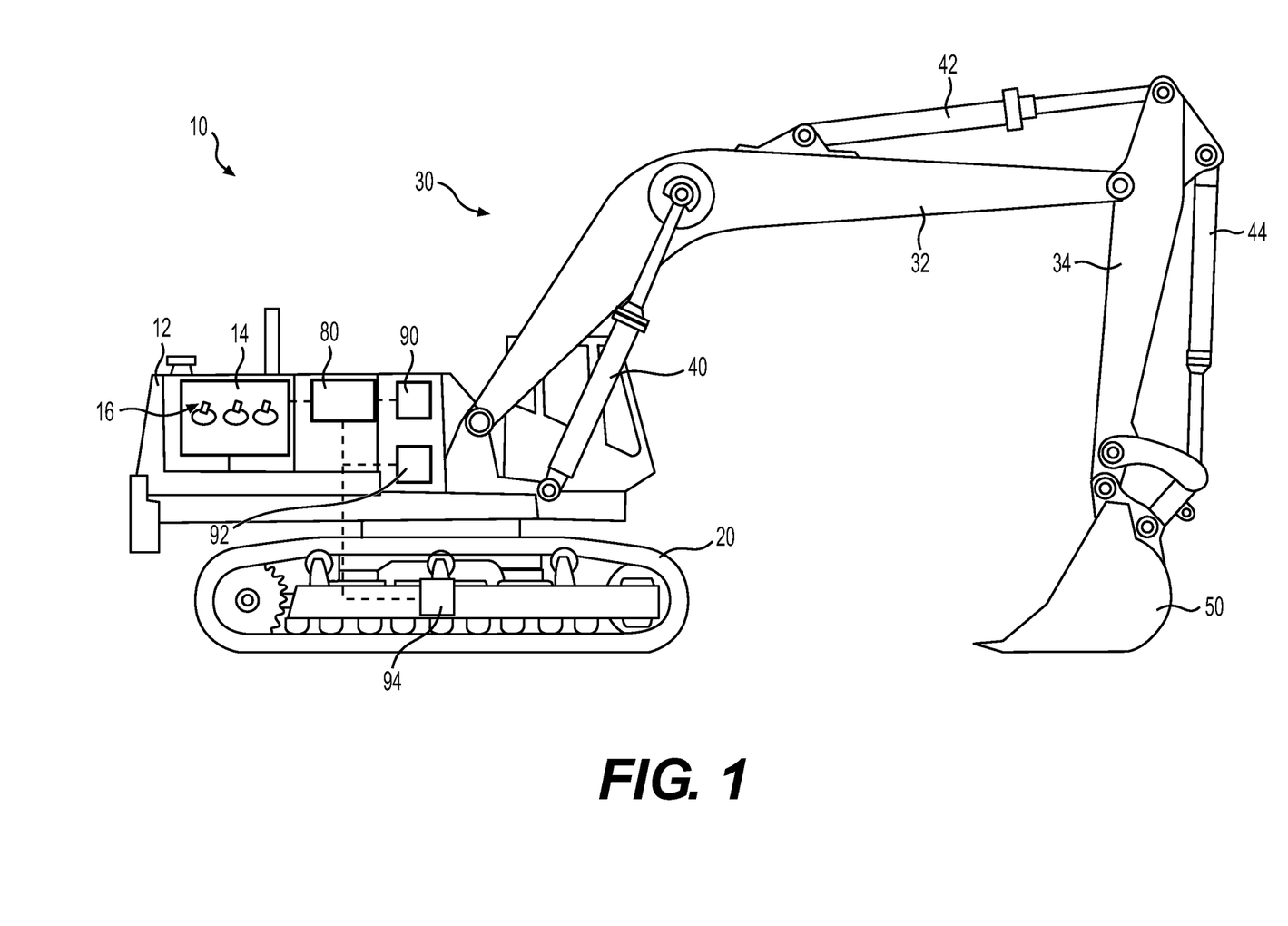
FIG. 1 is a partially schematic view of a machine including a machine control system, according to aspects of the present disclosure.

FIG. 1 illustrates a machine system 10 according to aspects of the present disclosure. Machine system 10 may include a mobile machine 12 and a unified or single controller 80 for controlling multiple systems of machine 12. Machine 12 may include a system for locomotion, such as one or more ground-engaging traction devices 20, a power generating system including a prime mover, an implement system 30, a hydraulic system including hydraulic pumps and hydraulic valve assemblies or valves 90, 92, and a powertrain system including transmission 94. In the example illustrated in FIG. 1, machine 12 is a hydraulic excavator. However, machine 12 may be any type of mobile machine, such as another type of earthmoving machine, a paving machine, etc. As a few examples, machine 12 may be a motor grader, dozer, compactor, truck, loader, cold planer, paver, skid steer, mining machine, or another type of machine.

The prime mover of machine 12 may include an internal combustion engine 14 configured to combust fuel in a plurality of cylinders. While the examples described herein refer to an internal combustion engine 14, the prime mover may include an electric motor, a fuel cell, or other power-generating devices, in addition to an internal combustion engine. Internal combustion engine 14 may be configured to combust a liquid fuel, such as diesel or gasoline, and/or a gaseous fuel, such as natural gas, and output generated power to transmission system 94. In the example shown in FIG. 1, internal combustion engine 14 includes a plurality of fuel injectors 16 which may be configured to inject diesel fuel into the cylinders of engine 14.

Implement system 30 of machine 12 may be hydraulically actuated to perform a suitable type of work, such as earthmoving, in response to operator requests. Implement system 30 may include a plurality of movable members, such as a boom 32, a stick or arm 34, and an implement 50. As used herein, an "implement" may be any device or system of machine 12 that works on material, e.g., for earthmoving. For example, an implement may include a bucket as shown in FIG. 1, and/or a blade, a truck bed, a drum, a screed, a conveyor, a fork, a ripper, drilling components, etc. The hydraulic system for actuating boom 32, arm 34, and implement 50 may include one or more pumps (not shown), a plurality of hydraulic valves (e.g., hydraulic valves 90 and 92), and a plurality of hydraulic cylinders (e.g., cylinders 40, 42, and 44). While two hydraulic valves are illustrated in FIG. 1, as understood, three hydraulic valves (e.g., hydraulic valves for cylinders 40, 42, and 44, respectively), or more, may be present. Each hydraulic valve may be configured to actuate a respective hydraulic cylinder, such as cylinders 40, 42, and 44. The one or more hydraulic pumps of the hydraulic system may be driven by engine 14 to provide a flow of hydraulic fluid for actuating cylinders 40, 42, and 44.

Ground engaging devices 20 may include tracks or wheels that are configured to propel machine 12 in a controllable manner in response to operator requests. Ground engaging devices 20 may be connected to a transmission 94 which is in turn connected to internal combustion engine 14 to receive power generated by engine 14. Transmission system 94 may include control elements that allow selection between a plurality of gear ratios or speeds to effectively transfer power from engine 14 to other ground engaging device 20 in a known manner.

Unified controller or unified control module (UCM) 80 may be a single controller that controls each of the functions of machine 12. UCM 80 may be a multiple-input multiple-output (MIMO) control system that decouples inputs by receiving the sensor and request information that would conventionally be provided to separate controllers. UCM 80 may, for example, control the power generating system (e.g., internal combustion engine 14), hydraulic system (e.g., valves 90 and 92), and transmission 94. Thus, UCM 80 may perform the functions of an engine controller and machine controller, as well as those of a transmission controller.

Figure 3:
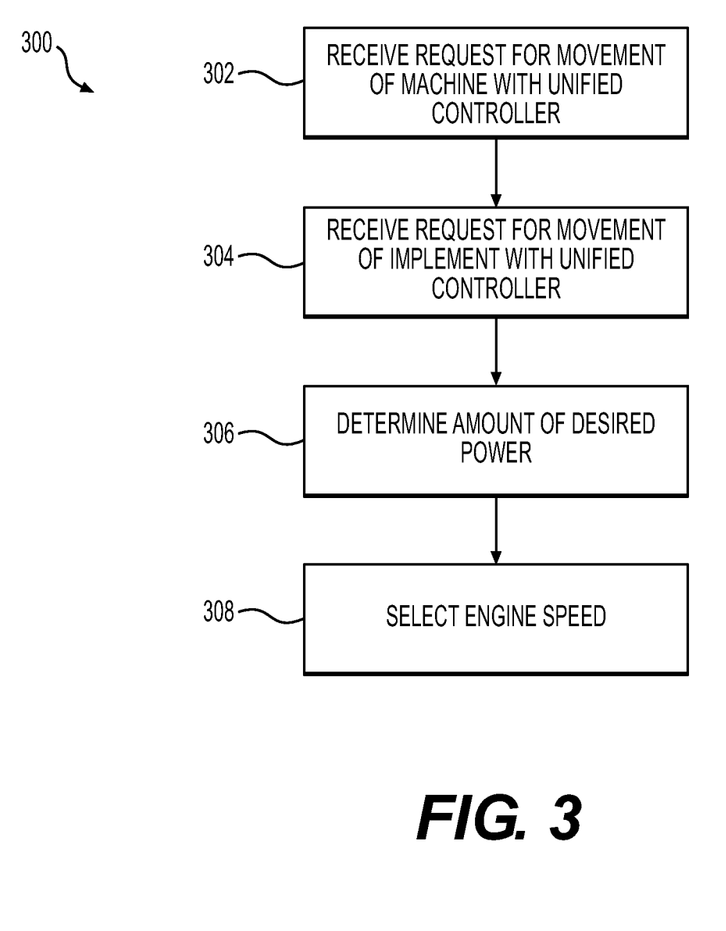
FIG. 3 is a flowchart of a machine control method, according to aspects of the present disclosure.

UCM 80 may include a single microprocessor or multiple microprocessors configured to receive sensed inputs and generate commands to control the operation of components of machine 12, as described above. UCM 80 may include a memory, a secondary storage device, processor(s), such as central processing unit(s), networking interfaces, or any other means for accomplishing a task consistent with the present disclosure. The memory or secondary storage device associated with UCM 80 may store data and software to allow UCM 80 to perform its functions, including the functions described below with respect to method 300 (FIG. 3). In particular, data and software in memory or secondary storage device(s) may allow UCM 80 to receive inputs from an operator and generate commands for the hydraulic, transmission, and engine systems as described herein. Data and software in memory or secondary storage device(s) may allow UCM 80 to employ optimization algorithm 220, state estimator 222, cost function 224, and constraint 226 functions described below. Various other circuitry may be associated with UCM 80 to facilitate the performance of these functions, including signal-conditioning and analysis circuitry, communication circuitry, display control circuitry, and other appropriate circuitry.

Figure 2:
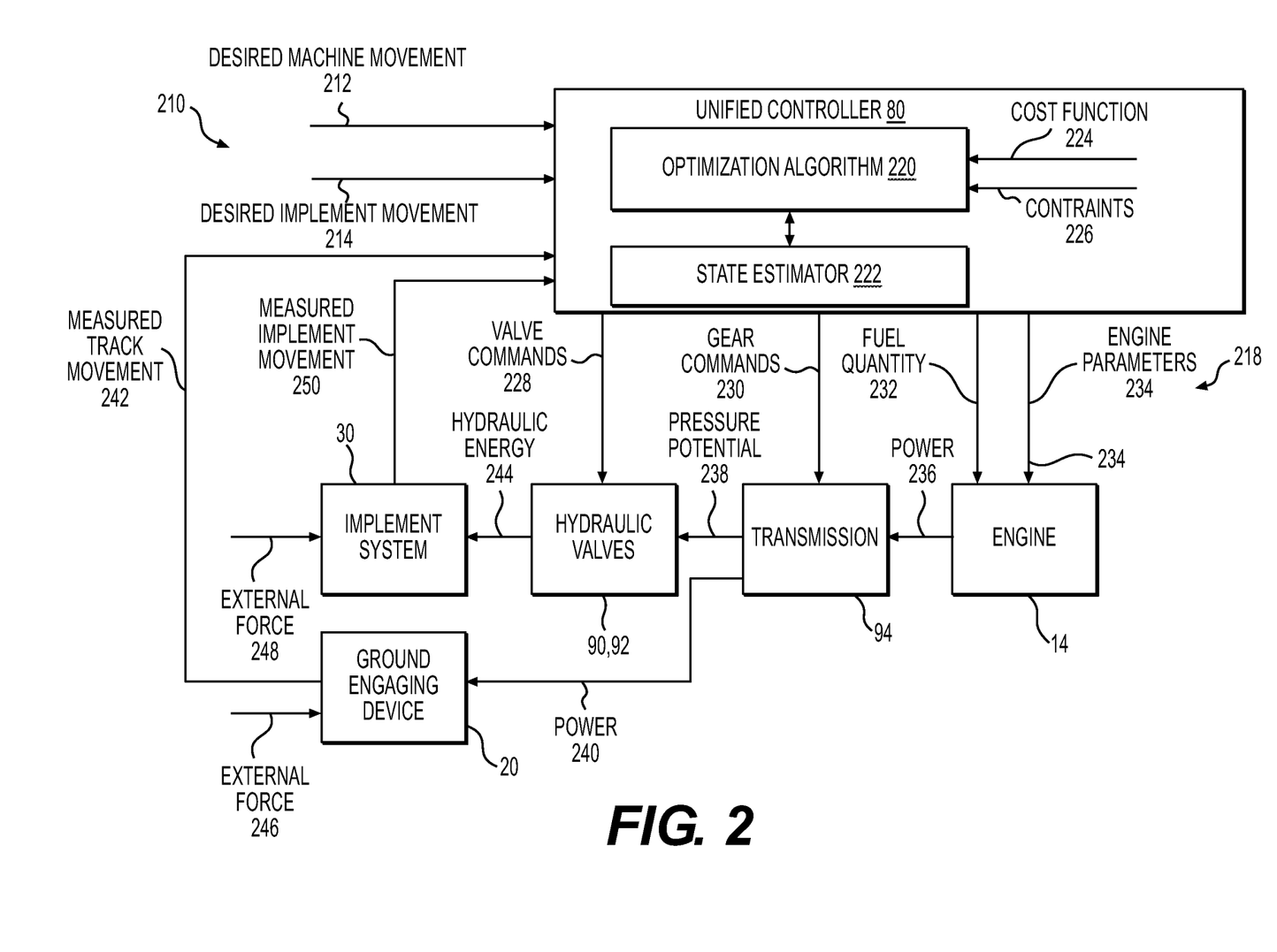
FIG. 2 is a block diagram of an exemplary machine control system of FIG. 1.

FIG. 2 is a block diagram illustrating an exemplary configuration of UCM 80 for controlling each of the systems of machine 12. Configurations of UCM 80, including the example shown in FIG. 2, may be useful for receiving each of the inputs from machine 12, including requests generated by an operator via a plurality of input devices (e.g., joysticks, pedals, switches, etc.), and may generate commands to respond to these requests, without the need for communication between separate engine and machine controllers. UCM 80 may also receive feedback information from components of these systems, in order to monitor the operating conditions of components of machine 12.

Inputs 210 to UCM 80 may include operator requests, including a desired machine movement 212 and a desired implement movement 214, as well as feedback information, such as measured track (or other ground-engaging device 20) movement. Outputs 218 generated by UCM 80 may include valve commands 228, gear commands 230, fuel quantity commands 232, and engine parameter commands 234. UCM 80 may include an optimization algorithm 220 that allows UCM 80 to select particular commands to generate as outputs 218. Optimization algorithm 220 may operate in conjunction with a cost function 224, constraints 226, state estimator 222, and inputs 210, to select an optimal set of control points (e.g., commands) to control the operation of hydraulic valves 90, 92, transmission 94, and engine 14, as described below.

Desired machine movement 212 may correspond to a movement request generated by an operator's interaction with one or more input devices associated with the ground-engaging devices 20, such as a joystick or pedal. Desired machine movement 212 may represent a requested amount of motion for each track of a plurality of tracks or other ground engaging devices 20, and may be determined based on an amount a pedal or joystick is actuated, for example. Desired implement movement 214 may correspond to a different movement request generated when an operator interacts with an input device such as a joystick or pedal.

This desired implement movement 214 may also correspond to an amount an input device is actuated.

Valve commands 228 may, for example, correspond to commands to hydraulic control valves 90, 92, etc., to actuate hydraulic cylinders 40, 42, and 44. Valve commands 228 may cause boom 32, arm 34, and bucket 50 to move together in a manner that corresponds to desired implement movement 214. Gear commands 230 may correspond to commands to transmission 94 to select a particular gear position. Fuel quantity 232 may correspond to a command generated by UCM 80 and provided to fuel injectors 16 that causes fuel injectors 16 to inject a desired amount of fuel. Engine parameters 234 may include commands to control other aspects of engine 14, including a shot mode (e.g., whether a pilot injection and/or post injection will be performed), injection timing (e.g., start of injection timing), fuel pressure (e.g., a pressure of fuel in a common fuel rail), a position of an air valve (e.g., and intake throttle valve), EGR valve position, etc.

Based on the fuel quantity 232 and engine parameters 234, engine 14 may combust fuel to generate an output power 236. Power 236 may be transferred from engine 14 to transmission 94 in a known manner. Transmission 94 may select a gear ratio or speed according to gear commands 230 to transfer received power 236 as an output power 240. Output power 240 may drive ground engaging device 20 and move machine 12 according to desired movement 212. Transmission 94 may also output pressure potential 238 (e.g., via one or more hydraulic pumps) to supply pressurized fluid to valves 90, 92. The path of the hydraulic fluid may be determined by the positions of hydraulic valves 90, 92. In some aspects, these positions of valves 90, 92 may be individually controlled by valve commands 228 (e.g., commands that selectively energize and de-energize solenoids associated with hydraulic valves 90, 92). The position of each hydraulic valve assembly or valve 90, 92 may determine a direction in which hydraulic energy 244 is supplied to each hydraulic cylinder 40, 42, and 44 to extend or retract these cylinders and thereby control movement of movable components of implement system 30.

During movement or work, ground engaging device 20 and implement system 30 may encounter respective external forces 246 and 248. For example, bucket 50 may encounter resistance during earthmoving (e.g., when entering the ground or carrying a load). Tracks or wheels of ground engaging device 20 may encounter loose material (e.g., gravel or sand) and may slip, or may meet additional resistance (e.g., when traveling along a grade). UCM 80 may be configured to estimate external forces 246 and 248, as described below.

Feedback information received by UCM 80 may include measured track movement 242 and measured implement movement 250. Measured track movement 242 may correspond to signal(s) generated by one or more speed sensors (e.g., proximity sensors positioned to detect changes in position of a track, wheel, gear, etc.), accelerometers, etc. of machine 12 that detect a movement of tracks, wheels, etc. Measured implement movement 250 may correspond to signal(s) generated by one or more position sensors configured to detect a position of hydraulic cylinders 40, 42, and 44, one or more accelerometers, etc.

In at least some aspects, optimization algorithm 220 may be configured to receive desired machine movement 212, desired implement movement 214, measured track movement 242, and measured implement movement 250. Optimization algorithm 220 may allow UCM 80 to generate control signals to operate machine 12, including hydraulic valves 90, 92, transmission system 94 and engine 14. Optimization algorithm 220 may be capable of model-based predictive control. In particular, optimization algorithm 220 may include information useful for modeling machine 12, including both engine 14 and implement system 30, to allow optimization algorithm to generate commands that cause machine 12 to operate in a desired manner.

State estimator 222 may correspond to one or more physics-based (e.g., empirical) models and/or equations that allow UCM 80, with optimization algorithm 220, to calculate expected values of external force 246 and 248. State estimator 222 may be configured to facilitate the estimation of other aspects of machine 12 that are not directly measured.

Optimization algorithm 220 may be configured to evaluate various sets of potential control points (e.g., particular valve commands 228, gear commands 230, fuel quantity commands 232, engine parameter commands 234) for each of the controllable components of engine 14 and implement system 30. Optimization algorithm 220 may be configured to evaluate how the different sets of control points affect the operation of machine 12 and engine 14. For example, optimization algorithm 220 may be configured to determine, for a particular set of candidate control points, expected performance values of machine 12. Exemplary expected performance values may include calculated or expected values of: fuel consumption, NOx emissions, soot emissions, exhaust temperature, generated power, machine movement (e.g., speed and acceleration), implement movement, and others.

Cost function 224 may include one or more weighting factors for evaluating the calculated performance values to determine the desirability of the associated set of candidate control points or commands. Thus, one or more of the performance values may be associated with a cost representative of desirable and undesirable performance. For example, cost function 224 may assign a higher cost to sets of control points that would result in low fuel economy, undesired emissions performance, production of smoke, etc.

For some types of performance values and/or control points, there may be conditions that should not be allowed. These may be stored in a memory of UCM 80 as constraints 226. Exemplary constraints 226 may include physical limits of machine 12 and engine 14, or conditions that should not be permitted, such as a minimum and/or maximum value of engine speed, exhaust temperature, fuel pressure, and others.

INDUSTRIAL APPLICABILITY

Machine system 10 may include any appropriate machine that includes a prime mover, such as an internal combustion engine, and an implement. Machine system 10 may also be applied in a variety of machines or vehicles, including machines for earthmoving, paving, or other applications.

In machines including at least one implement and an internal combustion engine, it may be desirable to provide a unified or combined machine and engine controller that is configured to monitor the operation of the machine 12 including the operation of a prime mover such as an internal combustion engine, and an implement system such as system 30. In some aspects, a combined machine and engine controller may also be configured to operate as a transmission controller. The use of a unified or single controller, such as UCM 80, may avoid the need to generate a speed request signal and/or a torque request signal, as is generally necessary when separate engine and machine controllers are present. Additionally, the use of a unified or single controller may facilitate the removal of a governor, such as a proportional integral derivative (PID) speed or torque controller. The removal of a governor may, in at least some embodiments, simplify control of machine 12 and engine 14.

FIG. 3 is a flowchart illustrating an exemplary method 300 for controlling machine 12 according to aspects of the present disclosure. Steps 302 and 304 may include receiving respective request for movement of machine 12 with a single or unified controller. For example, step 302 may include receiving, with UCM 80, desired machine movement 212 when an operator interacts with one or more input devices associated with movement of machine 12, as described above. Step 304 may include receiving, with UCM 80, desired implement movement 214 when an operator interacts with one or more input devices associated with the implement system 30. In some aspects, steps 302 and 304 may be performed without receiving a manually-determined speed by UCM 80, such as an engine speed designated by an operator by placing speed control of engine 14 in a manual speed mode, and/or without receiving a desired speed command from a separate control device.

Figure 4:
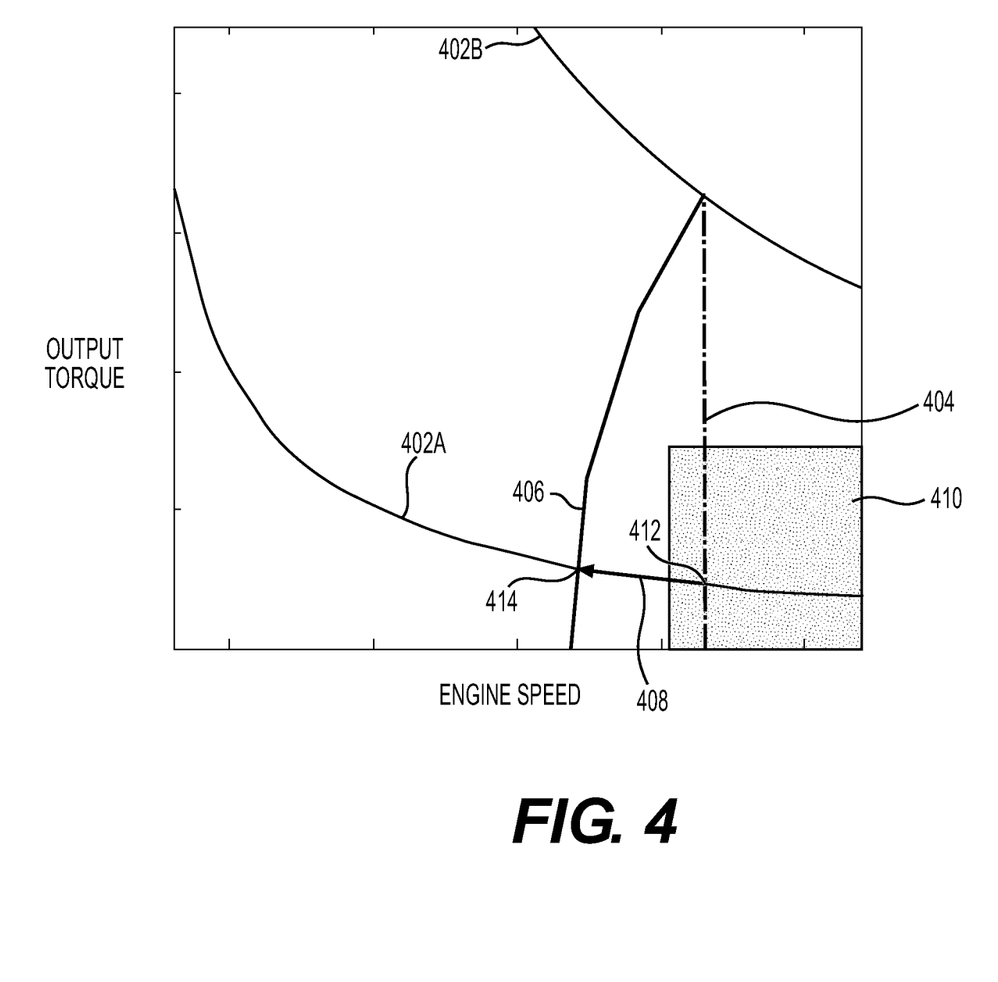
FIG. 4 is a chart illustrating exemplary engine speed and engine torque values for operating an engine in a system having a machine and engine controller, according to aspects of the present disclosure.

Once requests for machine movement and implement movement have been received, a step 306 for determining an amount of desired output from engine 14. This output may be sufficient to satisfy the requests received in steps 302 and 304. Thus, the desired output from engine 14 may be a desired power, in at least some embodiments. With reference to FIG. 4, an exemplary power determined in step 306 may correspond to a first output power 402A, which is represented by a curved line extending along points that each correspond to the same power to form a constant power line. A second output power 402B, which forms another constant power line, may represent a larger power (e.g., a maximum power produced by engine 14).

The desired power from engine 14 determined in step 306 may be calculated based on, for example, desired machine movement 212, desired implement movement 214, and external forces 246 and 248. In some aspects, desired power may be calculated with use of models of machine 12, including implement system 30, and engine 14. For example, state estimator 222 may include one or more models that are used to determine external forces 246 and 248, or other parameters of machine 12 and engine 14.

Step 308 may include operating engine 14 at a suitable engine speed while generating the power determined in step 306. This may include evaluating a plurality of candidates or potential engine speeds and engine torque pairs that are capable of producing this power, and determining other commands (e.g., fuel quantity commands, transmission commands). In the example illustrated in FIG. 4, these candidate engine speeds and engine torques correspond to points along the constant power line for first output power 402A. In particular, optimization algorithm 220 may evaluate sets of valve commands 228, gear commands 230, fuel quantity commands 232, and engine parameter commands 234. Optimization algorithm 220 may also determine a plurality of different performance values for each of these sets of control points or commands, in order to determine an optimal set of commands, e.g., based on models stored in state estimator 222. Optimization algorithm 220 may rank different sets of commands based on cost function 224 (e.g., by assigning ranks based on a plurality of weighted factors including fuel economy, soot production, NOx production, etc.), and may rule out one or more sets of commands that would violate constraints 226.

As an example, optimization algorithm 220 may evaluate a first set of candidate control points that would result in a first speed and torque corresponding to point 412. This set of control points may include potential values for commands 228, 230, 232, and 234. However, optimization algorithm 220 may determine that a second speed and torque corresponding to point 414 are more favorable (e.g., have a higher rank) according to cost function 224, as operating engine at point 412 may produce undesirable smoking. Thus, UCM 80 may determine to operate at a lower engine speed and higher torque associated with point 414, as indicated by shift 408.

UCM 80 may be configured to evaluate a plurality of different engine speeds that are different than engine speed 404. For example, as UCM 80 does not require a particular desired speed (and in at least some embodiments, does not receive a request for a particular engine speed or engine torque), UCM 80 may allow for changes in engine speed to determine an optimal point that satisfies the power determined in step 306. In the example shown in FIG. 4, UCM 80 may be configured to evaluate different sets of control points that correspond to different positions along constant power 402A. Thus, UCM 80 may, via optimization algorithm 220, cost function 224, and constraints 226, determine a set of control points for optimal operation of engine 14 without the need to employ a feedback loop that monitors engine speed. This optimal set of control points may result in optimization algorithm 220 generating fuel, intake valve, and other commands such that the predicted engine speed 414 will be outside of smoke-generation region 410. Thus, UCM 80 may, instead of selecting a first set of control points corresponding to point 412 (e.g., control points that satisfy requested speed 404), select a second set of control points corresponding to predicted engine speed 414. Method 300 may then return to step 302 for continued operation of system 10.

Optimal sets of control points may be determined in real time or near real time by UCM 80 as method 300 is performed, and based on the amount of power determined in step 306. For example, based on the amount of power associated with the requests received in steps 302 and 304, engine 14 may be operated at a plurality of different engine speeds and torques in an exemplary optimal zone 406, in contrast to systems that would operate engine 14 at a single engine speed 404, or a single engine torque, during one or more actions of machine system 10. The amount of power may be determined and updated regularly (e.g., continuously) during the operation of system 10.

In accordance with the present disclosure, in some engine systems, a single engine control module may store engine dynamic information as well as machine control data. Such an engine control module may store data representative of complex engine constraints, such as hardware limits and emissions limits. In particular, a single engine control module in accordance with the present disclosure may be a unified multiple-input multiple-output control system that monitors operator commands to generate suitable commands to a hydraulic system, transmission system, and engine system. In some aspects, a unified controller can select an optimal set of engine commands, for example by selecting suitable engine speed or fuel commands, to achieve desired movement without violating constraints for the machine or engine, and while minimizing fuel consumption. A unified controller may allow for the elimination of a speed-based PID governor or a torque-based PID governor. Additionally, a unified or combined machine and engine controller according to the present disclosure can simplify calibration of the controller and reduce the number of feedback loops in the control system from two feedback loops (a feedback loop for implement movement and a separate feedback loop for engine speed) to a single feedback loop, further simplifying control. A unified controller of the present disclosure may further avoid issues associated with multiple control systems, including avoiding the issuance of conflicting commands from different controllers.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A mobile machine control method, comprising:
    receiving, by a single controller, a first request for movement of the machine by a ground-engaging device;
    receiving, by the single controller, a second request for movement of an implement of the machine;
    determining, with the single controller, an amount of desired power from an engine to satisfy the first request and the second request;
    generating, by the single controller, a series of commands to adjust an engine, a hydraulic system, and a transmission to satisfy the first request and the second request;
    selecting, using a model-based predictive control technique, an engine speed from a plurality of candidate engine speeds to produce the desired power; and
    operating the engine at the selected engine speed to produce the desired power, wherein the engine is operated at the selected engine speed without the use of an engine speed governor.

2. The method of claim 1, wherein the engine speed is selected to avoid operating the engine at an engine speed that produces smoke.

3. The method of claim 1, wherein at least one of the series of commands generated by the single controller, without the use of a torque governor, is an engine command.

4. The method of claim 1, further including generating a first command to control a quantity of fuel supplied to the engine and a second command to control at least one hydraulic valve to actuate the implement, the first command and the second command being generated by the single controller.

5. The method of claim 4, further including generating a command for the transmission connected to the engine, with the single controller.

6. The method of claim 4, wherein the single controller includes a memory storing a model of the implement for use in the model-based predictive control technique.

7. The method of claim 4, wherein the first command controls a quantity of injected fuel and the second command controls actuation of a hydraulic valve of the implement.

8. The method of claim 1, further including:
    selecting an engine torque from a plurality of candidate engine torques to produce the desired power; and
    operating the engine at the selected engine torque to produce the desired power.

9. The method of claim 1, wherein the machine is an excavator.

10. A machine control method, comprising:
    receiving, by a single machine and engine controller:
        requests for movement of the machine and for movement of an implement; and
        feedback signals indicative of a movement of the machine and a movement of the implement;
    evaluating, by the single machine and engine controller, sets of candidate output commands for a transmission system and a hydraulic system to satisfy the requests and to satisfy feedback signals, the sets of candidate output commands being associated with a plurality of candidate engine torques;
    determining an engine torque, using a model-based predictive control technique, based on the requests for movement from the plurality of candidate engine torques; and
    generating an engine command associated with the engine torque without the use of an engine torque governor, based on the received requests and feedback information.

11. The method of claim 10, further including generating a transmission command to the transmission system connected to the engine and an implement command to an implement of the machine.

12. The method of claim 10, wherein the engine command is generated based on an optimization algorithm that receives the requests for movement of the machine and of the implement.

13. The method of claim 10, further including generating implement and transmission commands, based on the received requests and feedback information, with the machine and engine controller.

14. The method of claim 10, wherein the engine command is generated without the use of the torque governor that includes a PID controller.

15. The method of claim 10, wherein the implement is a ground-engaging device.

16. A machine control system, comprising:
    a ground-engaging traction device;
    an internal combustion engine;
    a transmission connected between the internal combustion engine and the ground-engaging traction device;
    a hydraulically-actuated implement; and
    a machine and engine controller configured to:
        receive a first request for movement of the ground-engaging traction device,
        receive a second request for movement of the implement,
        select an engine speed, using a model-based predictive control technique, from a plurality of candidate engine speeds based on a predicted power output necessary to satisfy the first request and the second request, and
        generate commands to operate the internal combustion engine at the selected engine speed, to control the hydraulically-actuated implement, and to control the transmission.

17. The machine control system of claim 16, wherein the machine and engine controller is configured to generate a first command to control a quantity of fuel supplied for combustion by the internal combustion engine.

18. The machine control system of claim 17, wherein the machine and engine controller is configured to generate a second command to actuate the implement.

19. The machine control system of claim 16, wherein the engine is operated at the selected engine speed without the use of an engine speed governor.

20. The machine control system of claim 16, wherein the ground-engaging traction device includes wheels or tracks, and wherein the hydraulically-actuated implement includes a plurality of linked moveable members, a hydraulic pump, a hydraulic valve, and a ground-engaging device.

* * * * *